United States Patent
Ha et al.

(10) Patent No.: US 7,324,430 B2
(45) Date of Patent: Jan. 29, 2008

(54) SYNCHRONIZATION DETECTION APPARATUS AND METHOD BASED ON ORTHOGONAL FREQUENCY DIVISION MULTIPLEXING

(75) Inventors: Tae-hyeun Ha, Seoul (KR); Jae-seok Kim, Gyeonggi-do (KR); Seong-joo Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 824 days.

(21) Appl. No.: 10/695,950

(22) Filed: Oct. 30, 2003

(65) Prior Publication Data

US 2004/0090977 A1    May 13, 2004

(30) Foreign Application Priority Data

Nov. 7, 2002   (KR) .................... 10-2002-0068761

(51) Int. Cl.
*H04J 11/00*  (2006.01)

(52) U.S. Cl. ...................................... 370/203; 370/208

(58) Field of Classification Search ............... 370/203, 370/208
See application file for complete search history.

(56) References Cited

U.S. PATENT DOCUMENTS

| | | | |
|---|---|---|---|
| 6,680,901 B1 * | 1/2004 | Yamamoto et al. | 370/208 |
| 2004/0156308 A1 * | 8/2004 | Ha et al. | 370/206 |

* cited by examiner

*Primary Examiner*—Melvin Marcelo
(74) *Attorney, Agent, or Firm*—Staas & Halsey LLP

(57) ABSTRACT

An orthogonal frequency division multiplexing (OFDM)-based synchronization detection apparatus including a $2^n$ level quantizing unit quantizing received data samples into levels of $2^n$, where n is an integer greater than or equal to zero (0), and a delaying unit delaying the data samples quantized through the $2^n$ level quantizing unit by a predetermined number of clocks and outputting data indicative thereof. A shifting unit shifts the output data samples of the $2^n$ level quantizing unit by an amount corresponding to an exponent of the output data of the delaying unit and a peak detecting unit detects a peak value from sums of outputs from the shifting unit.

15 Claims, 5 Drawing Sheets

US 7,324,430 B2

SYNCHRONIZATION DETECTION APPARATUS AND METHOD BASED ON ORTHOGONAL FREQUENCY DIVISION MULTIPLEXING

CROSS-REFERENCE TO RELATED APPLICATIONS

This application claims the priority of Korean Patent Application No. 2002-68761, filed on Nov. 7, 2002, in the Korean Intellectual Property Office, the disclosure of which is incorporated herein in its entirety by reference.

BACKGROUND OF THE INVENTION

1. Field of the Invention

The present invention relates to a method and apparatus for detecting synchronization at a receiving stage of an orthogonal frequency division multiplexing (OFDM) transmission system, and more particularly, to a method and apparatus of detecting a synchronization using samples quantized in $2^n$ levels.

2. Description of the Related Art

An orthogonal frequency division multiplexing (OFDM) system used in European digital video broadcasting for television (DVB-T), digital audio broadcasting (DAB), and high-speed wireless local area network (WLAN) systems synchronize a timing by detecting an offset in the timing of a received frame using a correlation between a received frame signal and a cyclic prefix signal for a frame.

FIG. 1 shows a transmission data format used in the European DVB-T system. Transmission data 100 includes a first cycle prefix 110, data 120, a second cycle prefix 140, and data 150. The first cycle prefix 110 is a copy of a portion 130 (i.e., duplication data) of the data 120, and the second cycle prefix 140 is a copy of a portion 160 of the data 150. The term "cycle prefix" is a duplicate portion of the transmission data 100 used for a purpose of detecting synchronization. When the cycle prefix is included in a data frame at a transmitting stage, a starting point of the data can be detected at a receiving stage using the cycle prefix.

FIG. 2 is a block diagram of a conventional correlation system for detecting a synchronization of the timing. Referring to FIG. 2, the correlation system 200 includes a delaying unit 210 delaying received input data samples by N clocks, a complex conjugate extracting unit 220 extracting complex conjugates of outputs of the delaying unit 210, a multiplying unit 230 multiplying outputs of the complex conjugate extracting unit 220 by the received input data samples, an integer extracting unit 240 extracting only integer parts from outputs of the multiplying unit 230, a moving sum calculating unit 250 summing up consecutive L outputs of the integer extracting unit 240 at every clock, and a peak detecting unit 260 detecting a maximum value among outputs of the moving sum calculating unit 250 and determining the synchronization of timing.

The moving sum calculating unit 250 calculates correlation values according to the following equation:

$$\Lambda(n) = \sum_{k=1}^{n+L} r(k) r^*(k-N) \quad (1)$$

where r(k) is a received signal sampled with a baseband frequency, N is a size of input data for Digital Fourier Transform (DFT) used in the OFDM system, and r*(k−N) is complex conjugate data of r(k) delayed by N clocks. Among the calculated correlation values $\Lambda(n)$, a maximum correlation value $\Lambda_{max}(n)$ represents a correlation peak, and based upon whether and where the correlation peak is detected, the timing is synchronized.

That is, in the transmission data shown in FIG. 1, there is a time delay of N clocks between the first cycle prefix data 110 and the duplication data 130 thereof. Therefore, if the correlation system 200 shown in FIG. 2 delays the received input data samples by N clocks, the data interval between every other cycle prefix can be spaced, and if the received input data sample refers to the cycle prefix, the moving sum calculating unit 250 outputs a maximum value because the cycle prefix and the duplication data 130 thereof are the same data. In this way, the correlation system shown in FIG. 2 can detect the synchronization of timing.

FIG. 3 is a block diagram of another conventional correlation system to detect the synchronization of the timing. Referring to FIG. 3, the correlation system 300 includes a sign bit quantizing unit 310 for quantizing input data using only sign bits of the input data, i.e., quantizing input signals as +1 if the input signals are greater than zero, or otherwise, as −1, a delaying unit 320 for delaying outputs of the sign bit quantizing unit 310 by N clocks, a complex conjugate extracting unit 330 for extracting complex conjugates of outputs of the delaying unit 320, and a multiplying unit 340 for multiplying outputs of the complex conjugate extracting unit 330 by the outputs of the sign bit quantizing unit 310. The correlation system 300 also includes an integer extracting unit 350 for extracting only integer parts from outputs of the multiplying unit 340, a moving sum calculating unit 360 for summing up consecutive L outputs of the integer extracting unit 350 at every clock, and a peak detecting unit 370 for detecting a maximum value among outputs of the moving sum calculating unit 360 and determining the synchronization of timing.

The conventional correlation systems described above require multiplying units for obtaining correlation values. However, because the circuit configurations for the multiplying units are very complex, the conventional correlation systems have disadvantageously complex hardware structures.

SUMMARY OF THE INVENTION

The present invention provides an orthogonal frequency division multiplexing (OFDM)-based synchronization detection apparatus and method with a simplified hardware structure and undiminished synchronization detection performance.

According to an aspect of the present invention, there is provided an OFDM-based synchronization detection apparatus, which includes a $2^n$ level quantizing unit quantizing received data samples into levels of $2^n$, where n is an integer greater than or equal to zero (0); a delaying unit delaying the data samples quantized through the $2^n$ level quantizing unit by a predetermined number of clocks and outputting data indicative thereof; a shifting unit shifting the output data samples of the $2^n$ level quantizing unit by an amount corresponding to an exponent of the output data of the delaying unit; and a peak detecting unit detecting a peak value from sums of outputs from the shifting unit.

In the OFDM-based synchronization detection apparatus, according to an aspect of the present invention, the $2^n$ level quantizing unit proportionally magnifies the received data samples by values of $2^n$, and converges the proportionally magnified data samples to levels of $2^m$, where m=0, 1, 2, ... n. The proportional magnification may include scaling of the samples r(k) in accordance with the following equation:

$$x = \frac{2^n r(k)}{\max r(k)}$$

Further, the convergence may include converging the normalized value x in accordance with the following equation:

$$Q_L(x) \cong \begin{cases} 2^{[\log_2 x]}, & x > 0 \\ 0, & x = 0 \end{cases}$$

where $[\log_2 x]$ is an integer mostly approximate to $\log_2 x$.

According to another aspect of the present invention, there is provided an OFDM based synchronization detection method, which includes quantizing received data samples into levels of $2^n$; delaying the quantized data samples by a predetermined numbers of clocks; shifting the quantized data samples by an amount corresponding to an exponent of the delayed data and outputting shifting results indicative thereof; and detecting synchronization using the shifted results.

According to an aspect of the present invention, there is provided an orthogonal frequency division multiplexing (OFDM)-based synchronization detection apparatus, including: a $2^n$ level quantizing unit quantizing received data samples into levels of $2^n$; a delaying unit delaying the quantized data samples by a predetermined number of clocks; a complex conjugate extracting unit extracting complex conjugates of the delayed quantized data samples; an n-bit shifting unit shifting quantized outputs q(k) from the $2^n$ level quantizing unit by an amount corresponding to a value of extracted complex conjugates; an integer extracting unit extracting integer parts from the shifted quantized outputs q(k) and outputting L outputs indicative thereof; a moving sum calculating unit summing up consecutively the L outputs at every clock; and a peak detecting unit detecting a maximum value among the summing up of the consecutive L outputs to determine a synchronization of timing.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and/or advantages of the invention will become apparent and more readily appreciated from the following description of the aspects of the present invention, taken in conjunction with the accompanying drawings of which.

DETAILED DESCRIPTION OF THE INVENTION

Figure 1:
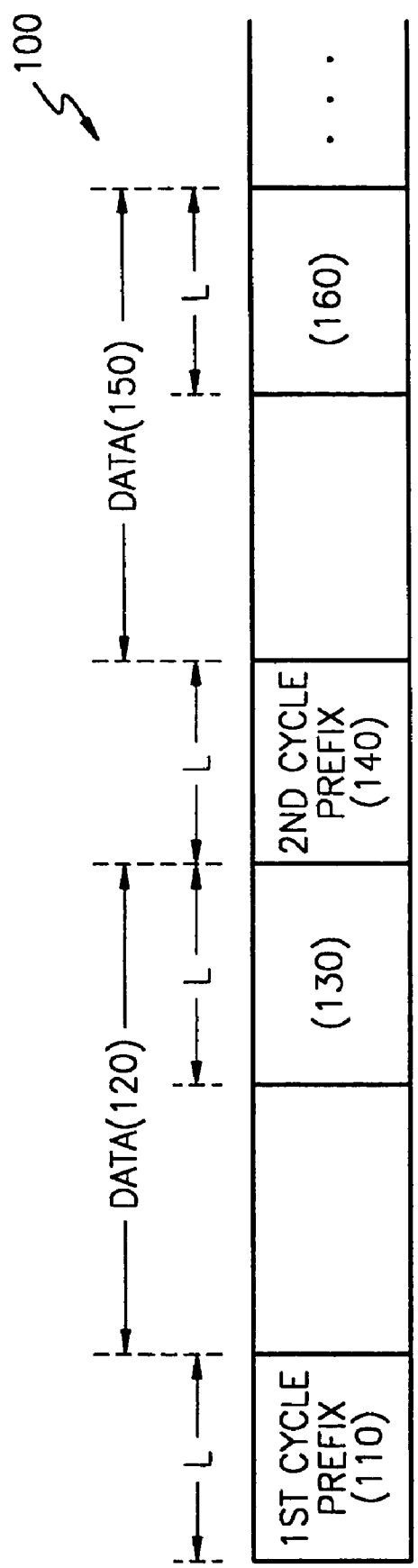
FIG. 1 shows a transmission data format according to a DVB-T standard.
Figure 2:
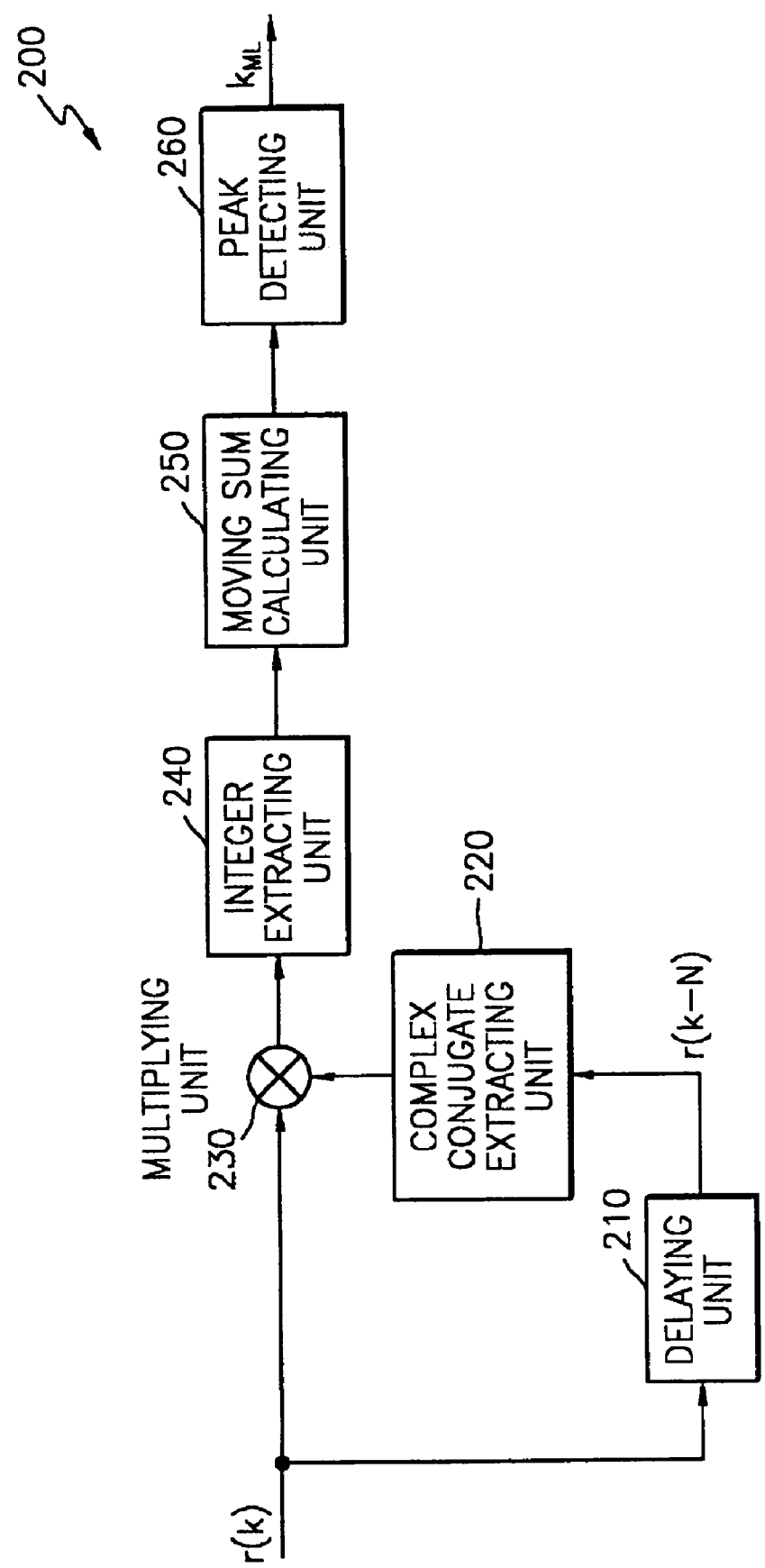
FIG. 2 is a block diagram of a conventional correlation system detecting synchronization of timing.
Figure 3:
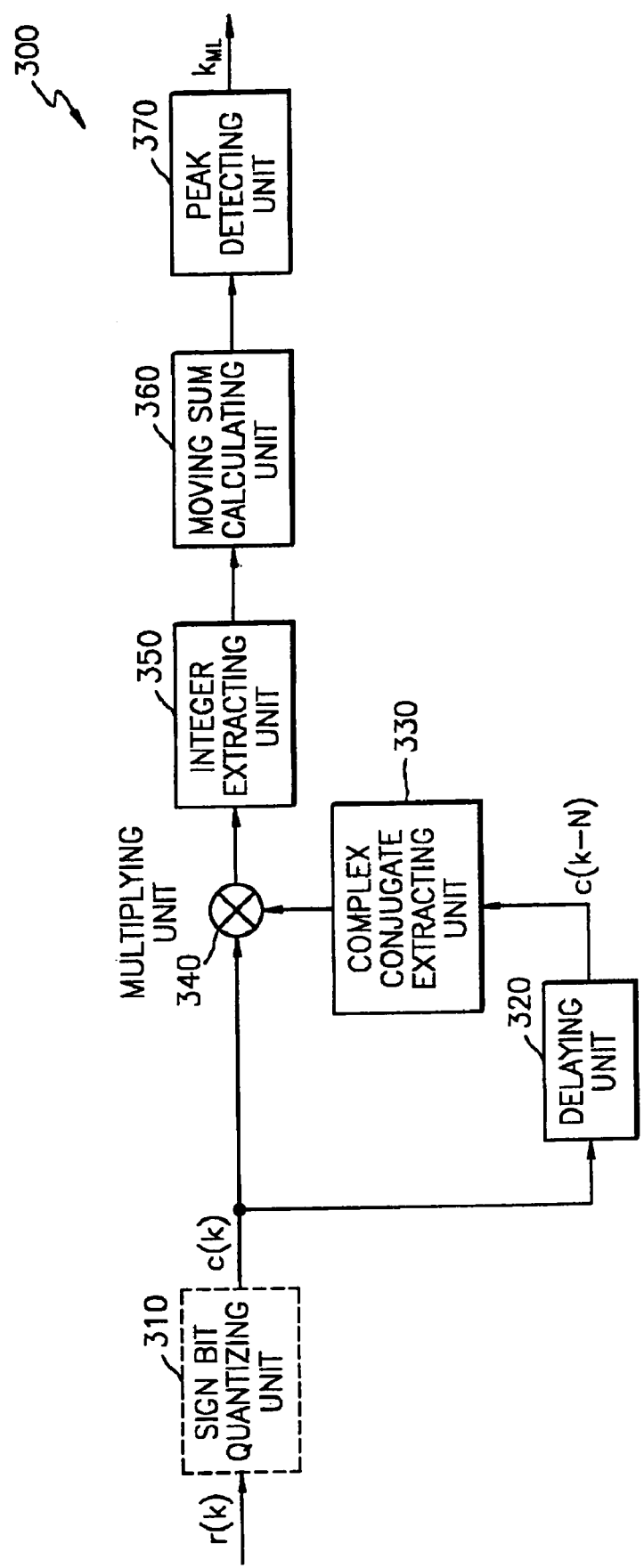
FIG. 3 is a block diagram of another conventional correlation system detecting the synchronization of the timing.

Reference will now be made in detail to the aspects of the present invention, examples of which are illustrated in the accompanying drawings, wherein like reference numerals refer to like elements throughout. The aspects are described below in order to explain the present invention by referring to the figures.

As described above with reference to FIG. 1, a cycle prefix used for detecting a synchronization of a timing at a receiving stage of a DVB-T system is a periodic copy of a portion of transmission data. While the cycle prefix has been detected by delaying received data by N clocks and using a complex multiplier for multiplying the delayed data directly with the received data, the detection of the cycle prefix, according to an aspect of the present invention, is performed by quantizing the received data in $2^n$ levels and using a shifter instead of the complex multiplier.

Figure 4:
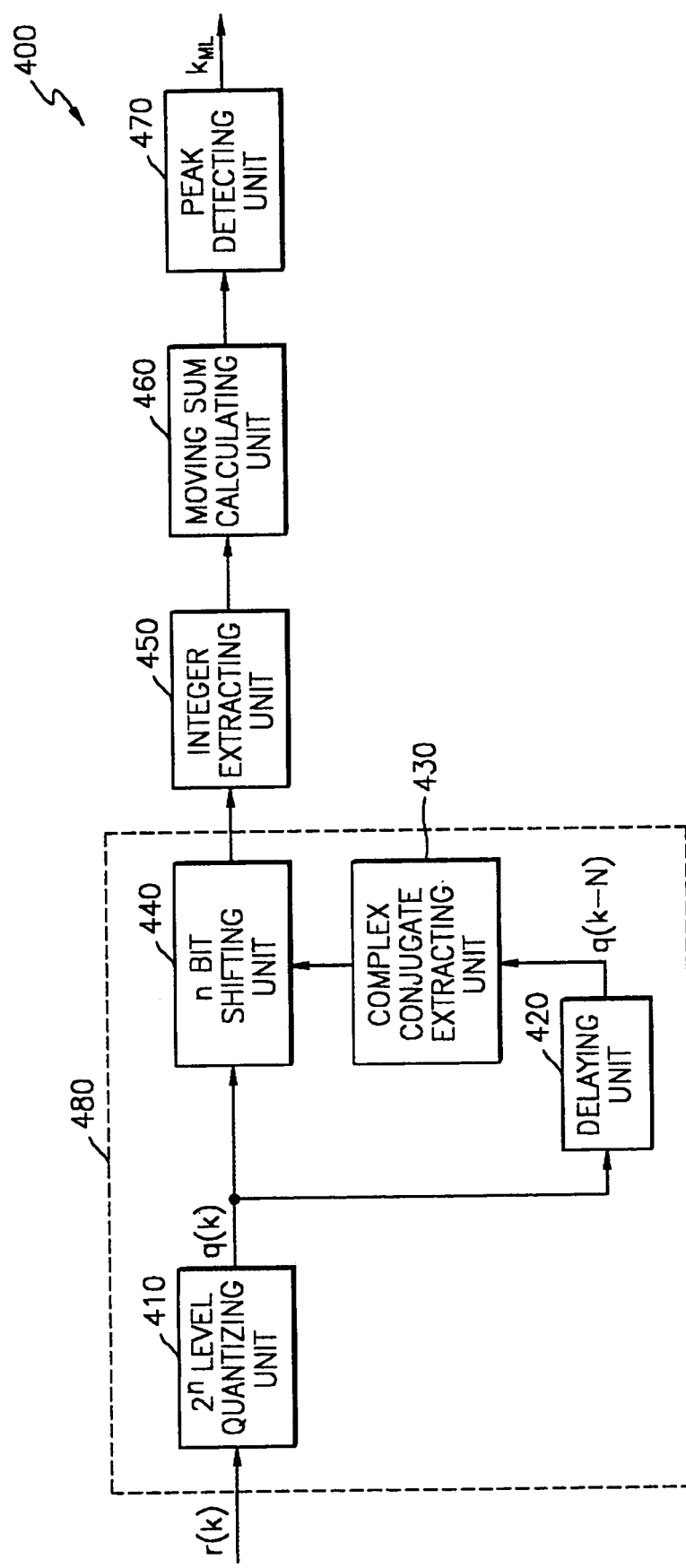
FIG. 4 a block diagram of a correlation system detecting the synchronization of the timing, according to an aspect of the present invention.

FIG. 4 shows a correlation system for detecting the synchronization of the timing, according to an aspect of the present invention. Referring to FIG. 4, the correlation system 400, according to an aspect of the present invention, includes a $2^n$ level quantizing unit 410 quantizing received data samples into levels of $2^n$, a delaying unit 420 delaying the quantized data samples through the $2^n$ level quantizing unit 410 by a predetermined number of clocks, a complex conjugate extracting unit 430 extracting complex conjugates of delayed quantized data samples from the delaying unit 420, and an n-bit shifting unit 440 shifting quantized outputs q(k) from the $2^n$ level quantizing unit 410 by an amount corresponding to a value of n extracted from the complex conjugate extracting unit 430. The correlation system 400 also includes an integer extracting unit 450 extracting only integer parts from outputs from the n-bit shifting unit 440, a moving sum calculating unit 460 summing up consecutive L outputs from the integer extracting unit 450 at every clock, and a peak detecting unit 470 detecting a maximum value among outputs from the moving sum calculating unit 460 and determining the synchronization of timing.

The $2^n$ level quantizing unit 410 quantizes the received data samples into a maximum of $2^n$ levels as follows. The $2^n$ level quantizing is defined as quantizing data levels of exponents of 2. For example, a $2^1$ level quantizing includes levels of 0, $2^0$, and $2^1$. In a $2^1$ level quantizing, a data sample between 0 and 1 is quantized into either 0 or 1 based on which one is closer, and a sample between 1 and 2 is quantized into either 1 or 2 based on which one is closer. Likewise, in a $2^2$ level quantizing, samples are quantized as any one level among 0, $2^0$, $2^1$, and $2^2$ levels, and in a $2^3$ level quantizing; the quantizing levels are 0, $2^0$, $2^1$, $2^2$, and $2^3$.

Figure 5:
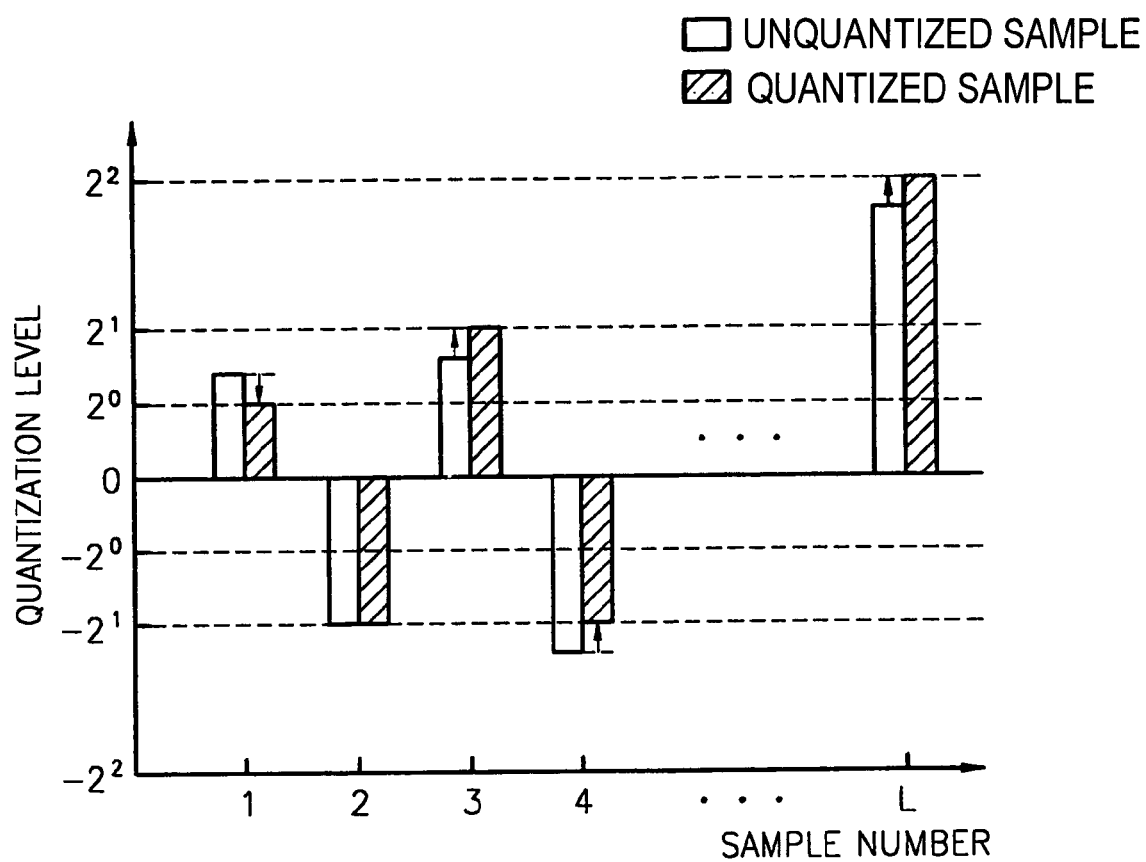
FIG. 5 is a graph illustrating a $2^n$ level quantization method used in the correlation system shown in FIG. 4.

FIG. 5 shows samples quantized into levels of $2^n$. For example, sample 1 having a value between $2^0$ and $2^1$ is quantized into $2^0$ because the value is closer to $2^0$, and sample 4 having a value between $2^1$ and $2^2$ is quantized into $2^1$ because the value is closer to $2^1$. By quantizing the samples in this way, every sample has a value that is an exponent of 2, and by using the quantized samples, the complex multiplication in the conventional systems can be replaced with simple shifting.

The $2^n$ level quantizing method will be described in more detail below. If the samples r(k) in the above-described Equation (1) are substituted with $2^n$ level quantized samples q(k), the following equation is obtained:

$$\Lambda(n) = \sum_{k=1}^{n+L} q(k)q^*(k-N) \quad (2)$$

If a sample max r(k) having a largest value among the samples r(k) is $2^n$, and the other samples r(k) are proportionally magnified or scaled, the $2^n$ level quantized samples q(k) can be represented by a quantization function $Q_L$ as follows:

$$q(k) = Q_L\left[\frac{2^n r(k)}{\max r(k)}\right] \quad (3)$$

The term $Q_L[x]$ in Equation (3) represents a complex quantization to quantize the scaled sample values into levels of $2^i$ in accordance with the following equation:

$$Q_L[x] \cong Q[Re\{x\}] + jQ[Im\{x\}] \quad (4)$$

The term $Q_L[x]$ can also be represented as follows:

$$Q_L(x) \cong \begin{cases} 2^{[\log_2 x]}, & x > 0 \\ 0, & x = 0 \end{cases} \quad (5)$$

In Equation (5), $[\log_2 x]$ is an integer mostly approximate to $\log_2 x$. Through the quantizing processes described above, the $2^n$ level quantized samples q(k) can have $2^m$ level quantized values, and the conventional complex multiplier can be replaced with a simple m-bit shifter. The quantizing processes described above are performed through the $2^n$ level quantizing unit 410, the quantized values q(k) are transmitted to the delaying unit 420 and the n-bit shifting unit 440.

If the shifter is used instead of the multiplier, Equation (1) can be represented as follows:

$$\Lambda(n) = \sum_{k=1}^{n+L} \{q(k) \ll l(k-N)\} \quad (6)$$

$$l(k-N) = \log_2 q^*(k-N) \quad (7)$$

The term $q(k) \ll l(k-N)$ in Equation (6) represents a shift of the quantized value q(k) to the left bit location by $l(k-N)$ bits. Meanwhile, Equation (7) represents a transformation of the $2^n$ level quantized samples $q^*(k-N)$ into the values of $l(k-N)$, which are values of exponents extracted from the $2^n$ level quantized samples. Although an element for performing the transformation of $q^*(k-N)$ into $l(k-N)$, i.e., an element for extracting the values of the exponents from the $2^n$ level quantized samples is not shown in FIG. 4, but it will be understood by those of ordinary skill in the art that such an element can be interposed between the complex conjugate extracting unit 430 and the n-bit shifting unit 440. Further, it will be understood by those of ordinary skill in the art that the shifting of a bit by the value of an exponent extracted as described above performs the same function as a multiplication.

As described above, according to an aspect of the present invention, because correlation coefficients quantized in $2^n$ levels are used in a correlation apparatus for detecting synchronization at receiving stages of an OFDM system, and a shifter can be used instead of a conventional complex multiplier, a complexity of a hardware structure can be reduced without diminishing a system performance.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An orthogonal frequency division multiplexing (OFDM)-based synchronization detection apparatus, comprising:
    a $2^n$ level quantizing unit quantizing received data samples into levels of $2^n$, where n is an integer greater than or equal to zero (0);
    a delaying unit delaying the data samples quantized through the $2^n$ level quantizing unit by a predetermined number of clocks and outputting data indicative thereof;
    a shifting unit shifting the output data samples of the $2^n$ level quantizing unit by an amount corresponding to an exponent of the output data of the delaying unit; and
    a peak detecting unit detecting a peak value from sums of outputs from the shifting unit.

2. The OFDM-based synchronization detection apparatus according to claim 1, wherein the $2^n$ level quantizing unit proportionally magnifies the received data samples by values of $2^n$, and converges the proportionally magnified data samples to $2^m$ levels, where m=0, 1, 2, . . . n.

3. The OFDM-based synchronization detection apparatus according to claim 2, wherein the proportional magnification of the received data samples comprises scaling of samples r(k) to obtain scaled samples x in accordance with the following equation:

$$x = \frac{2^n r(k)}{\max r(k)}.$$

4. The OFDM-based synchronization detection apparatus according to claim 3, wherein the convergence comprises converging the scaled samples x in accordance with the following equation:

$$Q_L(x) \cong \begin{cases} 2^{[\log_2 x]}, & x > 0 \\ 0, & x = 0 \end{cases}$$

where $[\log_2 x]$ is an integer mostly approximate to $\log_2 x$.

5. An orthogonal frequency division multiplexing (OFDM)-based synchronization detection method, comprising:
    quantizing received data samples into levels of $2^n$;
    delaying the quantized data samples by a predetermined numbers of clocks;
    shifting the quantized data samples by an amount corresponding to an exponent of the delayed data and outputting shifting results indicative thereof; and
    detecting synchronization using the shifted results.

6. The OFDM-based synchronization detection method according to claim 5, wherein the quantization comprises:

proportionally magnifying coefficients by values of $2^n$, and converging the proportionally magnified coefficients to levels of $2^m$, where m=0, 1, 2 ... n.

7. The OFDM-based synchronization detection method according to claim 6, wherein the proportional magnification comprises:

scaling the samples r(k) to yield scaled samples x in accordance with the following equation:

$$x = \frac{2^n r(k)}{\max r(k)}.$$

8. The OFDM based synchronization detection method according to claim 7, wherein the convergence comprises:

converging the scaled samples x in accordance with the following equation:

$$Q_L(x) \cong \begin{cases} 2^{[\log_2 x]}, & x > 0 \\ 0, & x = 0 \end{cases}$$

where $[\log_2 x]$ is an integer mostly approximate to $\log_2 x$.

9. An orthogonal frequency division multiplexing (OFDM)-based synchronization detection apparatus, comprising:

a $2^n$ level quantizing unit quantizing received data samples into levels of $2^n$;

a delaying unit delaying the quantized data samples by a predetermined number of clocks;

a complex conjugate extracting unit extracting complex conjugates of the delayed quantized data samples;

an n-bit shifting unit shifting quantized outputs q(k) from the $2^n$ level quantizing unit by an amount corresponding to a value of extracted complex conjugates;

an integer extracting unit extracting integer parts from the shifted quantized outputs q(k) and outputting L outputs indicative thereof;

a moving sum calculating unit summing up consecutively the L outputs at every clock; and a peak detecting unit detecting a maximum value among the summing up of the consecutive L outputs to determine a synchronization of timing.

10. The OFDM-based synchronization detection apparatus according to claim 9, wherein the $2^n$ level quantizing unit quantizes the received data samples into a maximum of $2^n$ levels.

11. The OFDM-based synchronization detection apparatus according to claim 10, wherein the quantized $2^n$ levels are defined as quantizing data levels of exponents of 2.

12. The OFDM-based synchronization detection apparatus according to claim 9, wherein the quantized outputs q(k) are represented by a quantization function $Q_L$, where a sample max r(k) having a largest value among the samples r(k) is $2^n$, and other samples r(k) are proportionally magnified or scaled, as follows:

$$q(k) = Q_L\left[\frac{2^n r(k)}{\max r(k)}\right].$$

13. The OFDM-based synchronization detection apparatus according to claim 12, wherein $Q_L[x]$ represents a complex quantization to quantize the scaled samples r(k) into levels of $2^i$ in accordance with the following equation:

$$Q_L[x] \cong Q[Re\{x\}] + jQ[Im\{x\}].$$

14. The OFDM-based synchronization detection apparatus according to claim 12, wherein $Q_L[x]$ represents a complex quantization to quantize the scaled samples r(k) into levels of $2^i$ in accordance with the following equation:

$$Q_L(x) \cong \begin{cases} 2^{[\log_2 x]}, & x > 0 \\ 0, & x = 0. \end{cases}$$

15. The OFDM-based synchronization detection apparatus according to claim 12, wherein the moving sum calculating unit calculates correlation values according to the following equation:

$$\Lambda(n) = \sum_{k=1}^{n+L} \{q(k) << l(k-N)\} \quad l(k-N) = \log_2 q^*(k-N)$$

$l(k-N) = \log_2 q^*(k-N)$ where the term $q(k) << l(k-N)$ represents a shift of the quantized value q(k) to the left bit location by l(k−N) bits, and $l(k-N) = \log_2 q^*(k-N)$ represents a transformation of the quantized $2^n$ level samples $q^*(k-N)$ into the values of l(k−N), which are values of exponents extracted from the $2^n$ level quantized samples.

* * * * *